Nov. 3, 1953 E. F. PETERS ET AL 2,658,059
ETHYLENE POLYMERIZATION IN THE VAPOR PHASE
Filed April 27, 1950
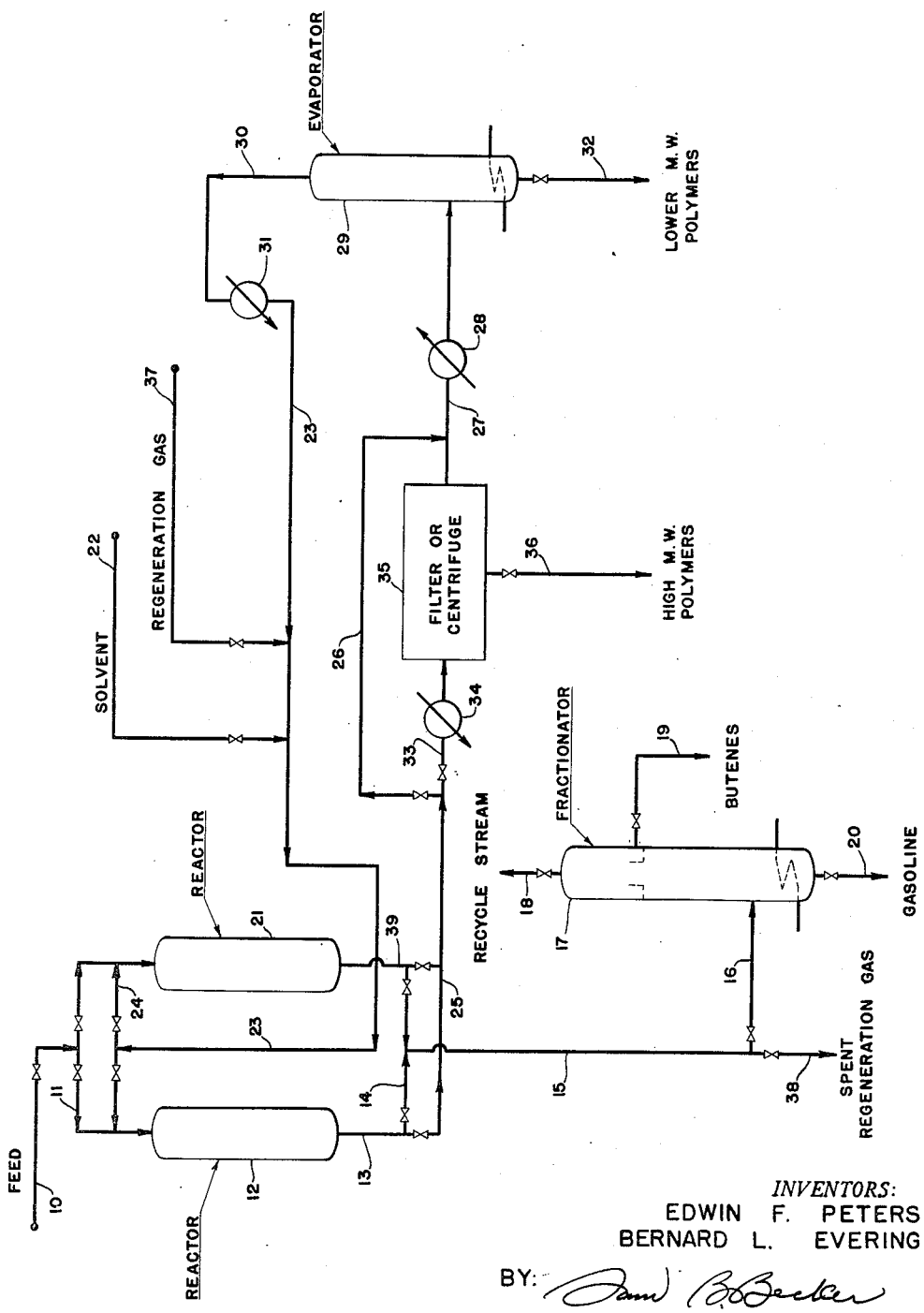
INVENTORS:
EDWIN F. PETERS
BERNARD L. EVERING
BY:
ATTORNEY:

UNITED STATES PATENT OFFICE 2,658,059

ETHYLENE POLYMERIZATION IN THE VAPOR PHASE

Edwin F. Peters and Bernard L. Evering, Chicago, Ill., assignors to Standard Oil Company, Chicago, Ill., a corporation of Indiana Application April 27, 1950, Serial No. 158,572

18 Claims. (Cl. 260—94.9)

This invention relates to a process for the polymerization of ethylene and, more particularly, to a vapor phase catalytic process for converting ethylene in substantial yields predominantly to low boiling hydrocarbons boiling in the butenes and motor fuel boiling range and to relatively minor, but nevertheless important, yields of high molecular weight wax-like and/or tough resinous polyethylenes.

One object of our invention is to provide a novel process for the conversion of ethylene in the presence of certain eighth group metal catalysts. Another object of our invention is to provide a vapor phase polymerization process for the conversion of ethylene to low boiling polymerization products and, concurrently, to normally solid polymerization products. An additional object of our invention is to provide a novel method for the regeneration of active carbon-supported nickel and cobalt catalysts and for the simultaneous recovery of normally solid polymerization products therefrom. Yet another object of our invention is to provide the art with new synthetic hydrocarbon waxes and resins. These and other objects of our invention will become apparent from the ensuing description thereof.

Briefly, the process of our invention comprises contacting a gas stream comprising essentially ethylene, which is substantially free of catalyst poisons or ethylene polymerization inhibitors, with an activated carbon-supported metal selected from the class consisting of nickel, cobalt and nickel-cobalt mixtures in the vapor phase at a temperature sufficient to induce substantial ethylene polymerization, said temperature being between about 10° C. and about 200° C. at a weight space velocity between about 0.2 and about 2 grams of ethylene per hour per gram of catalyst. Under these conditions, the ethylene is converted in substantial yield predominantly to dimers, trimers and other polymers boiling substantially within the motor fuel boiling range and concurrently to smaller yields of normally solid polymerization products varying in nature from soft grease-like hydrocarbon materials to tough, resinous high molecular weight polyethylenes similar to the commercial polyethylene resins. We have made the surprising discovery that although the used solid catalysts derived from the above described process appear dry, they can contain a substantial proportion, varying usually between about 5 and about 25 weight percent on the fresh catalyst, of normally solid ethylene polymers and that these polymers can be removed in substantial proportions from the used catalyst by a suitable process of extraction with solvents. The normally solid ethylene polymers are not substantially removed as such from the pores of the adsorbent catalysts employed in the present invention by heating to high temperatures, for example about 300° C., or by treating the catalysts with gases such as hydrogen at said high temperatures. Furthermore, regeneration procedures based solely upon heating the catalysts or treating them with hydrogen at high temperatures do not result in as complete regeneration of the spent catalysts as that achieved by the present process.

To describe the present invention in somewhat greater detail, attention will be concentrated first upon the polymerization feed stock. The feed stock comprises essentially ethylene. Carbon monoxide, hydrogen sulfide and ammonia function as catalyst poisons and should be removed from feed stocks in which they are present. Although carbon monoxide is quite readily removed by treating the catalyst with hydrogen, we have found that ammonia is very tenaciously adsorbed in the activated carbon-supported catalysts and is quite difficult to remove by high temperature (300–350° C.) hydrogen treating and/or evacuation. Oxygen in relatively small proportions, up to 1000 or 2000 p. p. m., does not appear to exert a deleterious effect on the present ethylene polymerization process, although when the cumulative amount of oxygen charged to the catalyst is high as about 3 mol percent based upon the metal content of the catalyst, substantial deactivation of the catalyst may occur. Although oxygen does not apparently interfere in the polymerization reaction, it will cumulatively convert the reduced metal catalyst to metal oxide which is catalytically inactive. Commercial ethylene streams containing from about 100 to about 1000 parts per million of oxygen can, therefore, be employed without special deoxygenation treatment in the practice of the present invention. In peroxide-catalyzed processes for ethylene polymerization, amounts of oxygen within the range of 100 to 1000 p. p. m. in the ethylene feed stock are usually considered to exert a substantial deactivating effect.

Ethane and other normally gaseous paraffin hydrocarbons in the ethylene charging stock function as diluents, but not as catalyst poisons and may, therefore, be present in the feed stock. Normally gaseous olefins other than ethylene are preferably removed from the feed stock since they tend to inhibit the formation of high molecular weight polymers, especially when present in concentrations greater than about 10 volume percent, based on the ethylene.

The catalysts employed in the operation of our process comprise essentially cobalt, nickel and cobalt-nickel mixtures. In order to increase the accessibility of the catalytic metal to the ethylene, it is desirable by some means to dilute, attenuate or extend the catalytic metal, and this may be done in a variety of ways. Thus, the catalytic metal may be diluted by employing it in the form of an alloy with one or more other metals which do not adversely affect the desired ethylene polymerization reaction; the catalytic metal and diluent metal can both be deposited on active carbons, e. g., activated coconut charcoal. For example, the nickel and/or cobalt may be employed as alloys or mixtures with copper. The catalysts may be employed in the form of pellets, powders, turnings or screens. Also, the surface of the catalytic metal may be extended by the preparation of an aluminum or silicon alloy thereof, followed by extraction of the aluminum or silicon with strong caustic and reduction of the metal oxide or hydroxide with hydrogen, e. g., as described in U. S. Patents 1,563,587 and 1,628,190 of Murray Raney, and in numerous subsequent publications. The surface of the catalytic metal may be etched by treatment with strong acids, particularly nitric acid, followed by water washing and hydrogen reduction in order to effect activation.

Although it might appear obvious that the surface of the catalytic metal could be readily and conveniently extended by deposition of the metal upon any one of a number of porous or adsorbent supports, we have made the surprising discovery that this is not, in general, feasible. Highly active nickel and cobalt catalysts for hydrogenation of fats and other unsaturated organic materials have heretofore been prepared by depositing various nickel and cobalt salts or other compounds upon porous supports such as silica gel, alumina, celite, kieselguhr, aluminosilicates, etc., decomposing the nickel or cobalt compound, usually to form the corresponding metal oxide and hydrogenation of the metal oxide to produce the catalytically active metal (Carleton Ellis, "Hydrogenation of Organic Substances," D. Van Nostrand Co., Inc. (1930)). We have found, however, that the nature of the support specifically and unpredictably affects the utility of the nickel and cobalt catalysts for the purposes of polymerizing ethylene to normally solid polymers. Alumina and silica supports greatly reduce or, in some instances, virtually destroy the power of nickel and cobalt to catalyze the polymerization of ethylene to form normally solid polymers.

We have found that activated carbons, particularly activated charcoals derived from cellulosic materials having surface areas between about 700 and about 1200 m.$^2$/g., pore volumes of about 0.53 to 0.58 cc. per gram and pore diameters of about 20 to 30 Å., and, in some instances, small amounts of combined oxygen, greatly enhance the catalytic activity of nickel and cobalt for the purposes of ethylene polymerization, as compared with the activity of the unattenuated catalytic metals. When activated carbons are covered with water and the mixture is stirred for some time at room temperature, the water leaches various materials therefrom and it often happens that the resultant aqueous solutions are slightly basic; it is desirable to neutralize the basic materials contained in such carbons, particularly coconut charcoals, by treating the carbons with nitric acid, following which the residual nitric acid is removed by the application of heat to effect vaporization, or decomposition and vaporization. The nitric acid treatment of carbon causes some oxidation thereof.

The catalytic metal can be deposited upon the active carbon support by various methods well known in the art of catalyst preparation. Thus, the catalytic metal can be adsorbed upon the carbon in the form of a decomposable salt, e. g. in the form of nickel or cobalt nitrates, formates, carbonates, etc. We prefer to prepare the catalysts from nickel and/or cobalt nitrates. The adsorbed salt can be decomposed to yield nickel or cobalt oxides upon and within the active carbon support, and the oxides can be reduced to the catalytically active metals by treatment with hydrogen. The salt of the catalytic metal can be absorbed on the active carbon support in amounts sufficient to provide reduced catalytically active metal in concentrations between about .01 and about 20 percent by weight in the finished catalyst. Hydrogen reduction of the catalytic metal oxides can be effected at temperatures between about 200 and about 400° C. and hydrogen pressures between about 200 and about 2000 p. s. i. g.

As an alternative to adsorbing the catalytic metal upon the active carbon support in the form of a salt, use may be made of a readily decomposable compound such as a carbonyl, which can then be thermally decomposed to yield the catalytic metal. Even when nickel and cobalt catalysts are derived from the metal carbonyls, it is advisable to subject the catalyst to a treatment to remove carbon monoxide which has been adsorbed by the porous active carbon, e. g., to evacuation or to stripping with chemically inert gases such as nitrogen at elevated temperatures between about 200 and about 400° C. Adsorbed carbon monoxide may be removed from the catalyst by treatment with hydrogen at 200° C. to 400° C. and hydrogen pressures of about 200 to about 2000 p. s. i. g.

At relatively low concentrations of catalytic metal on active carbon, high pressure and low temperature, the possibilities of increasing the proportion of high molecular weight tough, resinous polyethylene in the total polymer are increased. At low metal concentrations (.01 to 5 weight percent) on the active carbon, it is more desirable to pretreat the active carbon by washing with nitric acid to minimize the ratio of acid-soluble contaminants in the active carbon to the catalytic metal.

We have found that active carbon supported nickel, under certain conditions, yields substantially greater amounts of tough, resinous high molecular weight polymers from ethylene than cobalt/carbon catalysts.

The particle size of the supported or unsupported metal catalysts can be varied to suit the requirements of the reaction equipment and process flow. Thus, if a stationary bed of catalyst is desired, the catalyst may be employed in the form of coarse fragments or pellets, e. g. as cylinders of about $\frac{1}{16}$ to $\frac{3}{4}$ inch length and $\frac{1}{16}$ to $\frac{3}{4}$ inch diameter. In fixed beds, we may also employ 6 to 14 mesh catalysts, and the like.

Although ethylene can be polymerized at room temperature or even lower temperatures, we prefer to employ temperatures in the range of about 100° C. to about 150° C., although temperatures up to about 250° C. may be employed. It will be understood that the selection of the best operating temperature in any specific instance must be made in consideration of other operating variables, such as the catalyst activity, pressure, ethylene concentration and the specific product distribution which is desired.

The reaction pressure should be at least about 500 p. s. i. g. to obtain satisfactory yields of solid ethylene polymers, but otherwise appears to be limited only by the maximum pressure economically attainable in the equipment. Thus, maximum pressures in our process may be as high as 15,000 or 20,000 p. s. i. g., or even more. However, solid ethylene polymers are deposited within the catalyst by the present process at relatively low pressures, e. g., about 1000, 2000 or 5000 p. s. i. g., which constitutes a distinct advantage of the present process over the processes heretofore known to be capable of producing the same or similar ethylene polymerization products. In general, we prefer to employ pressures between about 2000 and 5000 pounds. The pressures under consideration here are total pressures in the polymerization reaction zone. However, the pressure in the reaction zone is due largely to ethylene and, bearing this fact in mind, if large proportions of a diluent such as ethane are present in the feed stock, correspondingly high pressures should be employed in order to obtain suitable ethylene partial pressures in the reaction zone.

A variety of reaction systems can be employed for the practice of the present process. Thus, we may employ a moving bed system, similar to the moving bed systems currently employed in commercial catalytic cracking of hydrocarbon oils. In this type of operation the ethylene-containing charging stock is charged into the lower portion of a vertical tower against a downflow of fragments or pellets of the solid polymerization catalyst, suitably directed through the reactor by spaced baffles to provide extensive gas-solid contacting surface. Relatively low boiling ethylene polymerization products, together with unconverted ethylene are withdrawn from the upper portion of the moving bed reaction zone. Catalyst containing adsorbed normally solid ethylene polymers is withdrawn from the lower end of the moving bed reaction zone, subjected to procedures for regenerating the catalyst and for removal of the normally solid ethylene polymers therefrom and is then elevated to the upper portion of the moving bed reaction zone and recycled through the process.

The present polymerization process may also be effected in reaction systems in which the catalyst is present in the form of a fluidized mass, particularly in the form of a fluidized fixed bed. Fluidized fixed bed reactors have been described in numerous patents and publications, for example in a publication by C. A. Thomas et al., Ind. Eng. Chem. 37, 332 (1945). In fluidized operations, powdered catalysts, usually varying in size between about 40 and 100 mesh, are employed and reaction gases are forced therethrough at a superficial linear velocity between about 0.5 and about 1.5 feet per second. The fluidized fixed bed operation presents the advantages of uniform heat distribution throughout the catalyst bed, ready heat removal from the catalyst bed and ready removal of catalyst from the reactor for separation of adsorbed normally solid ethylene polymers and/or regeneration and recycle of spent catalyst.

A fixed bed reactor with either downflow or upflow of ethylene can be employed. Parallel fixed bed reactors can be employed to obtain continuous operation, as in fixed bed hydrocarbon catalytic cracking units, one bed being dewaxed and/or regenerated while the other bed is on stream by suitable manual or automatic time-cycle valve operations to control the flow of ethylene, catalyst dewaxing solvent and regeneration gases to each bed of catalyst. This type of operation is illustrated in the annexed figure.

Referring to the figure, a gaseous feed stock comprising essentially ethylene which has been substantially freed of inhibitors or poisons is passed through valved line 10 and manifold 11 into reactor 12, the valves in manifold 11 being manipulated to prevent the entrance of feed at the same time into reactor 21. The ethylene-containing charging stock is polymerized in reactor 12 in the presence of a catalyst, for example an activated charcoal-supported nickel catalyst containing about .1 to 5 weight percent of nickel at a temperature between about 75° C. and about 150° C. and pressures between about 500 and 5000 p. s. i. g., for example about 2000 p. s. i. g. at a space velocity between about 0.1 and about 5 grams of ethylene per hour per gram of catalyst. The exothermic heat of polymerization may be removed from the reactors by the use of suitable cooling coils or jackets (not shown) or other means known in the art. Low boiling ethylene polymerization products and unconverted ethylene are withdrawn from the lower portion of reactor 12 through valved line 13 and, by suitable manipulation of valves, through lines 14, 15 and 16 into a fractionator 17. In fractionator 17 a recycle stream comprising unconverted ethylene is taken overhead through valved line 18, whence it may be recycled, totally or in part, to feed charging line 10 (by lines not shown). A fraction comprising essentially butenes is withdrawn from tower 17 through valved line 19 and liquid motor fuel is withdrawn from the lower end of tower 17 through valved line 20. The butenes and gasoline fractions can be recycled to the polymerization reactors, if desired.

When the activity of the catalyst has declined to about 50 to about 75 percent of its initial value and the solid ethylene polymer content of the catalyst has increased to a value between about 5 and about 25 percent by weight of the weight of the fresh catalyst, the flow of ethylene-containing gaseous charging stock is diverted, by suitable manipulation of valves in manifold 11, into reactor 21 and reactor 12 is closed off to the entrance of additional gaseous charging stock. During the period when reactor 21 is on stream, the catalyst in reactor 12 is subjected to extraction and/or regeneration treatments, and vice versa.

A suitable dewaxing or deresining solvent is introduced through valved line 22 into line 23, thence into manifold 24 and reactor 12. The solvent passes down through the bed of solid catalyst in reactor 12 at a suitable temperature, usually between about 85° C. and about 150° C. under pressure sufficient to maintain the liquid phase, thereby extracting solid ethylene polymers retained within the catalyst particles and forming a solution of said polymers in said solvent. The solution is removed through line 13 whence it passes through line 25 for treatment to separate solvent and solute. In one mode of operation, the solution in line 25 may be diverted through valved line 26 into line 27, thence through heater 28 into an evaporator tower 29. Solvent is vaporized in tower 29, whence it passes overhead through line 30 and condenser 31, thence through line 23 for recycle. Molten polymers are withdrawn from tower 29 through valved line 32 for such further treatment as may be desired, for example fractionation with solvents or molecular distillation.

In those instances in which it is desired to make an initial separation between relatively high and relatively low molecular weight normally solid polymers, the solution in line 25 is passed through valved line 33 and cooler 34 into a filter, centrifuge or other conventional means for the separation of the relatively high molecular weight polymers, which separate from the hot solvent upon cooling. In cooler 34 the solution is suitably cooled to temperatures between about 50 and about 10° C. Cooling in cooler 34 may be effected by indirect refrigeration, for example, by the use of ammonia or other refrigerants, or by direct evaporative refrigeration, for example with a refrigerant and wax anti-solvent such as liquefied propane. Wax-like and/or tough, resinous ethylene polymers having molecular weights in the range of about 1000 to about 25,000 are withdrawn from equipment 35 through line 36. The solvent carrying relatively lower molecular weight ethylene polymers in solution is discharged from equipment 35 into line 27, heater 28 and evaporator 29, wherein solvent is evaporated and removed overhead through line 30 and relatively low molecular weight, grease-like polyethylenes are removed as a melt through valved line 32.

Suitable solvents for effecting extraction of the catalyst comprise aromatic hydrocarbons such as benzene, toluene, xylenes, p-cymene, ethylbenzene, n-propylbenzene, isopropylbenzene, sec-butylbenzene, t-butylbenzene, ethyltoluene, ethylxylenes and the like. In general, we may employ mononuclear aromatic hydrocarbons containing between about 6 and about 12 carbon atoms, preferably between about 6 and about 10 carbon atoms per molecule. We may also employ liquid saturated hydrocarbons having about 5 to about 12 carbon atoms per molecule, e. g. n-pentane, n-octane, cyclohexane and the like. We may also employ a liquid hydrocarbon solvent comprising liquid olefins, e. g. n-hexenes, cyclohexene, octenes, hexadecenes and the like.

Upon completing the extraction of the catalyst in reactor 12, it may, if desired, be subjected to regeneration treatment. Nickel and cobalt catalysts supported upon activated carbons are suitably regenerated with hydrogen or gases containing molecular hydrogen at temperatures between about 200 and about 400° C. and pressures between about 200 and about 2000 p. s. i. g. The regenerating gas may be introduced through valved line 37 into line 23, thence through manifold 24 into reactor 12. Spent regeneration gases are removed from reactor 12 through line 13, manifold 14, line 15 and valved line 38, whence they may be recycled totally or in part through valved line 37.

Before returning reactor 12 to on-stream (ethylene polymerization) operation or concurrent with the return of reactor 12 to on-stream operation, it may be desired to saturate the catalyst therein with the solvent material or with a different aromatic hydrocarbon material, for example, xylenes, mesitylene, p-cymene, their mixtures or the like. The saturation of the catalyst is carried to a point short of producing a catalyst which is wet with solvent, so that at all times the catalyst employed in the operation appears to be dry. Adsorption of the solvent or other aromatic material on the catalyst is usually carried to the point of adsorbing about 5 to about 25 percent by weight of said aromatic hydrocarbon material on the catalyst. The presaturation of catalyst with aromatic material tends to increase the yield of relatively high molecular weight polymerization products derived from ethylene in the present process.

With the return of reactor 12 to on-stream operation, the catalyst in reactor 21 is subjected to solvent and regeneration gas treatment as heretofore described in connection with reactor 12. Effluents from reactor 21 are removed through valved line 39.

The following specific examples are submitted for the purpose of illustrating and not for the purpose of unnecessarily limiting the invention.

*Example 1*

A catalyst of 18 weight percent cobalt on an activated coconut charcoal was prepared by adsorbing cobaltous nitrate from an aqueous solution with the carbon, decomposing the adsorbed nitrate at atmospheric pressure and reducing the resultant cobalt oxide-carbon catalyst within the reactor by a stream of hydrogen at 350° C. and 1200 p. s. i. g. The catalyst was of 6 to 14 mesh size and 177 grams (230 ml.) were employed packed into a vertical steel reaction tube. Commercial cylinder ethylene was passed downwardly through the catalyst in the reaction tube at a temperature between 100° C. and 120° C., 1000 p. s. i. g., and a space velocity of 0.3 gram of ethylene per hour per gram of catalyst for 3½ hours. The total amount of ethylene charged through the catalyst was about 489 grams. From the gaseous effluent of the polymerization reactor there were recovered 343 grams of butenes (77% 2-butene and 30% 1-butene) and 133 grams of $C_5$ and higher boiling hydrocarbons (mainly $C_6$, of which about 70 percent was n-hexene and 30 percent was 3-methylpentenes). The catalyst was extracted twice with 250 ml. portions of boiling xylene to obtain 18 grams of solute in the resultant xylene solution. Upon cooling the boiling xylene solvent to room temperature a polyethylene wax (3 grams) was precipitated and filtered. The filtrate was evaporated to yield 15 grams of a grease. The molecular weight of the grease was 309 (Menzies-Wright method). The specific viscosity ($N_{sp} \times 10^5$) of the polyethylene wax in xylene solution was 1600, employing the Staudinger method and using 0.125 gram of wax in 100 cc. of xylene at 85° C. for viscosity determination. The product distribution in weight percent was gasoline, 97; grease, 2; wax, 1.

*Example 2*

A catalyst of 1 weight percent cobalt on activated coconut charcoal was prepared by charcoal adsorption of a suitable amount of cobaltous nitrate from aqueous solution, decomposition of the supported nitrate in a bomb under the pressure of 20 mm. of mercury and reduction of the resultant cobalt oxide-charcoal catalyst with hydrogen at 260° C. and 1500 p. s. i. g. hydrogen pressure. The charcoal was pretreated before the adsorption step by covering it with 15 percent nitric acid solution at room temperature to leach out acid-soluble impurities. The reactor employed was a static bomb. Ethylene was polymerized in a bomb containing 76 grams of 6-14 mesh catalyst at 121° C. and 560 p. s. i. g. initial ethylene pressure, which dropped to 150 p. s. i. g. after 60 minutes. The bomb was then repressured with ethylene and it was found that the pressure dropped from an initial value of 570 p. s. i. g. to 260 p. s. i. g. over a period of 1½ hours. Products boiling in the motor fuel range and lower were removed from the catalyst by vaporization and the catalyst was then extracted with boiling xylene to obtain 17 grams of solid polyethylenes, which were separated from the xylene as described in Example 1. There were produced 5 grams of wax-like polyethylene having a melting point of 110° C., a softening point of 96-7° C. and a specific viscosity of 1800. There were also formed 12 grams of a grease-like polyethylene having a melting point below 50° C. and a molecular weight of 370.

*Example 3*

A 10 percent nickel on 6-14 mesh charcoal catalyst was prepared by adsorbing nickelous nitrate on the charcoal from an aqueous solution, decomposing the adsorbed nitrate under a pressure of 20 mm. of mercury and reducing with hydrogen at 1500 p. s. i. g. and 271° C. Ethylene was passed into a static bomb containing 175 ml. (92 g.) of the catalyst at 27° C. and the ethylene pressure was found to drop from 640 p. s. i. g. to 170 p. s. i. g. in 15 minutes. The bomb was then depressured and repressured with ethylene, whereupon it was found that the ethylene pressure dropped from 640 to 520 p. s. i. g. in the course of one hour. The bomb was depressured again and ethylene was added at 160° C. and 810 p. s. i. g.; the ethylene pressure dropped to 320 p. s. i. g. over the course of 100 minutes. The bomb was depressured and the catalyst therein was then extracted with boiling xylene to yield, by the separation procedure described in Example 1, 21 grams of a wax-like solid polyethylene having a softening point of 88° C., a melting point of 119-120° C. and a specific viscosity of 2220. A grease-like solid polyethylene (13 grams) which was separated from the xylene solvent was found to have a melting point below 50° C. and a Menzies-Wright molecular weight of 419.

The hydrocarbon greases produced by the present invention may be employed as a high viscosity index addition agent to lubricating oils and greases and may generally be employed as an impregnating wax, match wax and for compounding with other waxes and oils. The grease-like products are miscible with petroleum-derived paraffin waxes. The grease and paraffin wax-like products produced by the present invention may be subjected to high temperature vapor phase cracking to produce high molecular weight monoolefins which can be polymerized to extremely high V. I. lubricating oils by treatment with Friedel-Crafts catalysts, particularly aluminum chloride promoted by small proportions of hydrogen chloride. The grease-like and wax-like products may also be subjected to catalytic cracking with activated clays or silica-alumina or silica-magnesia type catalysts, optionally together with conventional charging stocks, to produce high octane number gasolines. The grease-like and wax-like products may also be chlorinated, predominantly to the stage of monochlorohydrocarbon compounds which may be chemically condensed with naphthalene or the like in the presence of aluminum chloride to provide pour point depressants for wax-containing lubricating oils.

The tough, resinous high molecular weight polymers which can be produced by the above-described process are characterized by partial solubility in boiling xylene (one atmosphere), softening points between about 100 and about 112° C., melting points between about 110 and about 130° C. and specific viscosities ($N_{sp} \times 10^5$, Staudinger method) between about 10,000 and about 25,000. The tough resinous polymers are characterized by relatively infrequent branches in the otherwise linear molecule, the methylene:methyl group ratios as determined by infrared spectroscopy being between about 15 and about 30. The tough resinous ethylene polymers can be cast or molded into tough thin films or fairly rigid thick films and may be processed by the methods heretofore employed in the treatment and formulation of the well known commercial polyethylene resins. The high molecular weight resins produced by our process may be applied to the same or similar uses as the commercial polyethylene resins. Even thin films of the high molecular weight resinous products produced by the present invention are characterized by extreme chemical resistance, high tear strength, high tensile strength, transparency and high electrical-insulating capacity. The tough resinous high molecular weight polymers can be chlorinated to a high chlorine content to produce interesting plastic materials.

In our copending application, Serial No. 222,802, filed April 25, 1951, as a continuation-in-part of our Serial No. 158,571, filed April 27, 1950, we have described and claimed the polymerization of ethylene to solid polymers by contact with activated carbon-supported nickel, cobalt or mixtures of cobalt and nickel in the presence of liquid hydrocarbons selected from the class consisting of saturated hydrocarbons and aromatic hydrocarbons.

Having thus described our invention, what we claim is:

1. In a process for the polymerization of ethylene by contact in the gaseous state with a catalyst comprising essentially an activated carbon-supported metal selected from the group consisting of nickel, cobalt and nickel-cobalt mixtures at a temperature between about 0° C. and about 250° C. and a pressure of at least about 500 p. s. i. g., the steps of continuing said process until said catalyst contains a substantial amount equal to at least about 5 percent by weight of solid ethylene polymers, extracting the used polymerization catalyst with a liquid solvent for normally solid ethylene polymers to produce a solution of said polymers in said solvent and thereafter recovering a normally solid ethylene polymer from said solution.

2. The process of claim 1 in which the liquid solvent is an aromatic hydrocarbon.

3. The process of claim 1 in which the liquid solvent is a mononuclear aromatic hydrocarbon.

4. The process of claim 1 in which the liquid solvent is a mononuclear aromatic hydrocarbon containing between about 6 and about 12 carbon atoms per molecule.

5. The process of claim 1 in which the liquid solvent is a mononuclear aromatic hydrocarbon and said extraction is conducted at a temperature between about 85° C. and about 150° C. under pressure sufficient at least to maintain said solvent substantially as a liquid phase.

6. The process of claim 1 wherein the activated carbon is an activated coconut charcoal.

7. In a process for the polymerization of ethylene by contact in the gaseous state with a catalyst comprising essentially an activated carbon-supported metal selected from the group consisting of nickel, cobalt and nickel-cobalt mixtures at a temperature between about 0° C. and about 250° C. and a pressure of at least about 500 p. s. i. g., the steps of continuing said process until said catalyst contains a substantial amount equal to at least about 1.7 percent by weight of solid ethylene polymers, extracting the used polymerization catalyst with a hot solvent for polyethylenes, cooling the resultant solution out of contact with said catalyst to insolubilize and solidify solute polyethylene waxes and resins having melting points between about 110° C. and about 130° C., separating said waxes and resins, and thereafter evaporating the remaining solution to separate grease-like polymers.

8. In a process for the polymerization of ethylene by contact in the gaseous state with a catalyst comprising essentially an activated carbon-supported metal selected from the group consisting of nickel, cobalt and nickel-cobalt mixtures at a temperature between about 0° C. and about 250° C. and a pressure of at least about 500 p. s. i. g., the steps of continuing said process until said catalyst contains a substantial amount equal to at least about 5 percent by weight of solid ethylene polymers, extracting the used polymerization catalyst with an aromatic hydrocarbon solvent at a temperature between about 85° C. and about 150° C., cooling the resultant solution out of contact with said catalyst to a temperature between about 50° C. and about 10° C. to insolubilize and solidify solute polyethylene waxes and resins having melting points between about 110° C. and about 130° C., separating said waxes and resins, and thereafter evaporating the remaining solution to separate grease-like ethylene polymers having melting points below 50° C.

9. The process of claim 8 wherein said aromatic hydrocarbon solvent is a xylenes fraction.

10. In a process for the polymerization of ethylene by contact in the gaseous state with a catalyst comprising essentially an activated carbon-supported metal selected from the group consisting of nickel, cobalt and nickel-cobalt mixtures at a temperature between about 0° C. and about 250° C. and a pressure of at least about 500 p. s. i. g, the steps of continuing said process until said catalyst contains a substantial amount equal to at least about 5 percent by weight of solid ethylene polymers, extracting the used polymerization catalyst with an aromatic hydrocarbon solvent at a temperature between about 85° C. and about 150° C., evaporating said solvent from the resultant solution out of contact with said catalyst and recovering ethylene polymers ranging from greases having melting points below about 50° C. to polyethylene waxes and resins having melting points between about 110° C. and about 130° C.

11. In a process for the polymerization of ethylene by contact in the gaseous state with a catalyst comprising essentially an activated carbon-supported metal selected from the group consisting of nickel, cobalt and nickel-cobalt mixtures at a temperature between about 10° C. and about 200° C., the steps of continuing said process until said catalyst contains between about 5 and about 25 percent by weight of solid ethylene polymers, extracting the used polymerization catalyst with a hot aromatic hydrocarbon solvent, cooling the resultant solution out of contact with said catalyst to insolubilize and solidify solute polyethylene waxes and resins having melting points between about 110° C. and about 130° C., separating said waxes and resins, and thereafter evaporating the remaining solution to separate grease-like polymers.

12. In a process for the polymerization of ethylene by contact in the gaseous state with a catalyst comprising essentially an activated carbon-supported metal selected from the group consisting of nickel, cobalet and nickel-cobalt mixtures at a temperature between about 10° C. and about 200° C., the steps of continuing said process until said catalyst contains between about 5 and about 25 percent by weight of solid ethylene polymers, extracting the used polymerization catalyst with an aromatic hydrocarbon solvent at a temperature between about 85° C. and about 150° C., cooling the resultant solution out of contact with said catalyst to a temperature between about 50° C. and about 10° C. to insolubilize and solidify solute polyethylene waxes and resins having melting points between about 110° C. and about 130° C., separating said waxes and resins, and thereafter evaporating the remaining solution to separate grease-like ethylene polymers having melting points below 50° C.

13. The process of claim 12 wherein said solvent is a xylenes fraction.

14. The process of claim 12 wherein said solvent is a xylenes fraction and said catalyst is activated carbon-supported nickel.

15. The process of claim 12 wherein said solvent is a xylenes fraction and said catalyst is an activated carbon-supported cobalt.

16. In a process for the polymerization of ethylene by contact in the gaseous state with a catalyst comprising essentially activated carbon-supported nickel at a temperature between about 0° C. and about 250° C. and a pressure of at least about 500 p. s. i. g., the steps of continuing said process until said catalyst contains a substantial amount equal to at least about 1.7 percent by weight of normally solid ethylene polymers, extracting the used polymerization catalyst with a liquid solvent for said normally solid ethylene polymers to produce a solution of said polymers in said solvent, and thereafter recovering normally solid ethylene polymers from said solution.

17. In a process for the polymerization of ethylene by contact in the gaseous state with a catalyst comprising essentially activated carbon-supported cobalt at a temperature between about 0° C. and about 250° C. and a pressure of at least about 500 p. s. i. g., the steps of continuing said process until said catalyst contains a substantial amount equal to at least about 1.7 percent by weight of normally solid ethylene polymers, extracting the used polymerization catalyst with a liquid solvent for said normally solid ethylene polymers to produce a solution of said polymers in said solvent, and thereafter recovering normally solid ethylene polymers from said solution.

18. In a process for the polymerization of ethylene by contact in the gaseous state with a catalyst comprising essentially activated carbon-supported nickel and cobalt at a temperature between about 0° C. and about 250° C. and a pressure of at least about 500 p. s. i. g., the steps of continuing said process until said catalyst contains a substantial amount equal to at least about 1.7 percent by weight of normally solid ethylene polymers, extracting the used polymerization catalyst with a liquid solvent for said normally solid ethylene polymers to produce a solution of said polymers in said solvent, and thereafter recovering normally solid ethylene polymers from said solution.

EDWIN F. PETERS.
BERNARD L. EVERING.

References Cited in the file of this patent

UNITED STATES PATENTS

| Number | Name | Date |
|---|---|---|
| 2,181,640 | Deanesly | Nov. 28, 1939 |
| 2,231,231 | Subkow | Feb. 11, 1941 |
| 2,259,961 | Myddleton | Oct. 21, 1941 |
| 2,457,556 | Heinemann | Dec. 28, 1948 |
| 2,460,303 | McAllister | Feb. 1, 1949 |
| 2,500,056 | Barr | Mar. 7, 1950 |